(12) United States Patent
Strickroth

(10) Patent No.: US 10,471,388 B2
(45) Date of Patent: Nov. 12, 2019

(54) SULFUR DIOXIDE REMOVAL FROM WASTE GAS

(71) Applicant: CPPE CARBON PROCESS & PLANT ENGINEERING S.A., Luxembourg-Dommeldange (LU)

(72) Inventor: Alain Strickroth, Belvaux (LU)

(73) Assignee: CPPE CARBON PROCESS & PLANT ENGINEERING S.A., Luxembourg-Dommeldange (LU)

( * ) Notice: Subject to any disclaimer, the term of this patent is extended or adjusted under 35 U.S.C. 154(b) by 0 days.

(21) Appl. No.: 16/091,097

(22) PCT Filed: Mar. 31, 2017

(86) PCT No.: PCT/EP2017/057789
§ 371 (c)(1),
(2) Date: Oct. 3, 2018

(87) PCT Pub. No.: WO2017/174472
PCT Pub. Date: Oct. 12, 2017

(65) Prior Publication Data
US 2019/0126200 A1 May 2, 2019

(30) Foreign Application Priority Data
Apr. 4, 2016 (LU) .......................................... 93012

(51) Int. Cl.
| | | |
|---|---|---|
| *B01D 53/86* | (2006.01) | |
| *B01J 21/18* | (2006.01) | |
| *B01J 35/00* | (2006.01) | |
| *B01J 35/02* | (2006.01) | |
| *B01J 35/10* | (2006.01) | |
| *C01B 17/78* | (2006.01) | |

(52) U.S. Cl.
CPC ..... *B01D 53/8609* (2013.01); *B01D 53/8665* (2013.01); *B01D 53/8687* (2013.01); *B01J 21/18* (2013.01); *B01J 35/0026* (2013.01); *B01J 35/023* (2013.01); *B01J 35/1028* (2013.01); *C01B 17/78* (2013.01); *B01D 2255/702* (2013.01); *B01D 2257/302* (2013.01); *B01D 2258/025* (2013.01)

(58) Field of Classification Search
CPC ......... C01B 17/74; C01B 17/76; C01B 17/78; C01B 17/90
See application file for complete search history.

(56) References Cited

U.S. PATENT DOCUMENTS

| | | | | |
|---|---|---|---|---|
| 4,710,364 A | * | 12/1987 | Berry | B01D 53/507 |
| | | | | 423/157.4 |
| 4,735,785 A | | 4/1988 | Eichholtz et al. | |
| 4,911,825 A | | 3/1990 | Roussel et al. | |
| 5,122,358 A | * | 6/1992 | Lailach | B01D 53/507 |
| | | | | 423/522 |
| 5,965,095 A | | 10/1999 | Owens et al. | |
| 6,136,749 A | | 10/2000 | Gadkaree et al. | |
| 6,149,886 A | | 11/2000 | Schoubye | |
| 7,387,981 B1 | | 6/2008 | Kaminsky et al. | |
| 7,722,843 B1 | | 5/2010 | Srinivasachar | |
| 8,628,603 B2 | | 1/2014 | Martin et al. | |
| 10,016,723 B2 | * | 7/2018 | Strickroth | B01D 53/507 |
| 2001/0038814 A1 | | 11/2001 | Fischer et al. | |
| 2003/0157010 A1 | | 8/2003 | Anastasijevic | |
| 2006/0229476 A1 | | 10/2006 | Mitchell, Sr. et al. | |
| 2007/0007201 A1 | | 1/2007 | Lupton | |
| 2008/0207443 A1 | | 8/2008 | Gadkaree et al. | |
| 2009/0111690 A1 | | 4/2009 | Gadkaree et al. | |
| 2010/0000408 A1 | | 1/2010 | Haruma et al. | |
| 2010/0239479 A1 | | 9/2010 | Gadkaree et al. | |
| 2010/0294130 A1 | | 11/2010 | Haruna et al. | |
| 2011/0223082 A1 | | 9/2011 | Chang et al. | |
| 2013/0108533 A1 | | 5/2013 | Strickroth | |
| 2013/0108858 A1 | | 5/2013 | Biteau et al. | |
| 2013/0202504 A1 | | 8/2013 | Pollack | |
| 2013/0206408 A1 | | 8/2013 | Chatterjee et al. | |
| 2013/0269521 A1 | | 10/2013 | Nishita et al. | |
| 2014/0314647 A1 | | 10/2014 | Strickroth | |
| 2016/0353743 A1 | | 12/2016 | Mills | |
| 2017/0087502 A1 | | 3/2017 | Jameson et al. | |

FOREIGN PATENT DOCUMENTS

| | | |
|---|---|---|
| CN | 1032772 A | 5/1989 |
| CN | 101573291 A | 11/2009 |
| EP | 0302224 A2 | 2/1989 |
| EP | 1459799 A1 | 9/2004 |
| EP | 1726565 A1 | 11/2006 |

(Continued)

OTHER PUBLICATIONS

International Preliminary Report on Patentability re: Application No. PCT/EP2017/057789, dated Apr. 3, 2018, pp. 1-36.
International Search Report dated Jun. 12, 2017 re: Application No. PCT/EP2017/057789, pp. 1-4, citing: EP 0 02 224 A2, EP 2 260 940 A1, JP H11 236207 A, JP 3 562551 B2.
Written Opinion dated Jun. 12, 2017 re: Application No. PCT/EP2017/057789, pp. 1-6, citing: EP 0 02 224 A2, EP 2 260 940 A1, JP H11 236207 A, JP 3 562551 B2.
H. J. Fell et al. "Removal of Dioxins and Furans From Flue Gases by Non-Flammable Adsorbents in a Fixed Bed", Chemosphere, 1998, vol. 37, Nos. 9-12, pp. 2327-2334, XP002769699.
International Search Report dated May 12, 2017 re: Application No. PCT/EP2017/056902, pp. 1-4, citing: Fell et al. "Removal of Dioxins . . . ", U.S. Pat. No. 7,722,843 B1, US 2008/207443 A1, US 2010/239479 A1, US 2009/111690 A1 and U.S. Pat. No. 4,911,825 A.

(Continued)

*Primary Examiner* — Timothy C Vanoy
(74) *Attorney, Agent, or Firm* — Cantor Colburn LLP

(57) ABSTRACT

A process where a gas, containing $SO_2$ and $O_2$ is brought in contact with a mixture of from 95% vol. to 50% vol. of activated carbon catalyst and from 5% vol. to 50% vol. of an inert filler material, where the $SO_2$ is converted to $H_2SO_4$ on the activated carbon catalyst and is then washed from the activated carbon catalyst to obtain a $H_2SO_4$ solution.

17 Claims, 14 Drawing Sheets

(56) References Cited

FOREIGN PATENT DOCUMENTS

| | | |
|---|---|---|
| EP | 2260940 A1 | 12/2010 |
| JP | H11236207 A | 8/1999 |
| JP | 2000296310 A | 10/2000 |
| JP | 2002282624 A | 10/2002 |
| JP | 2004081969 A | 3/2004 |
| JP | 3562551 B2 | 9/2004 |
| JP | 2006035042 A | 2/2006 |
| WO | 2008143831 A2 | 11/2008 |
| WO | 2015078953 A1 | 6/2015 |
| WO | 2016042005 A1 | 3/2016 |

OTHER PUBLICATIONS

Written Opinion dated May 12, 2017 re: Application No. PCT/EP2017/056902, pp. 1-5, citing: Fell et al. "Removal of Dioxins . . . " and U.S. Pat. No. 7,722,843 B1.
International Preliminary Report on Patentability dated Jul. 19, 2018 re: Application No. PCT/EP2017/058008, pp. 1-15, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1, WO 2016/042005 A1 and U.S. Pat. No. 7,387,981 B1.
International Search Report dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1, WO 2016/042005 A1 and U.S. Pat. No. 7,387,981 B1.
Written Opinion dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1 and WO 2016/042005 A1.
CN Office Action dated Feb. 28, 2019 re: Application No. 201780027960.9, pp. 1-12, citing: WO2016/042005A1, CN101573291A, CN1032772A, U.S. Pat. No. 6,149,886A and US2003/157010A1.
JP Office Acton dated Feb. 12, 2019 re: Application No. P2018-563463, pp. 1-7, citing: JP P2006-35042A, JP P2004-81969A, JP P2002-282626A, JP P2000-296310A and WO2015/078953A1.

\* cited by examiner

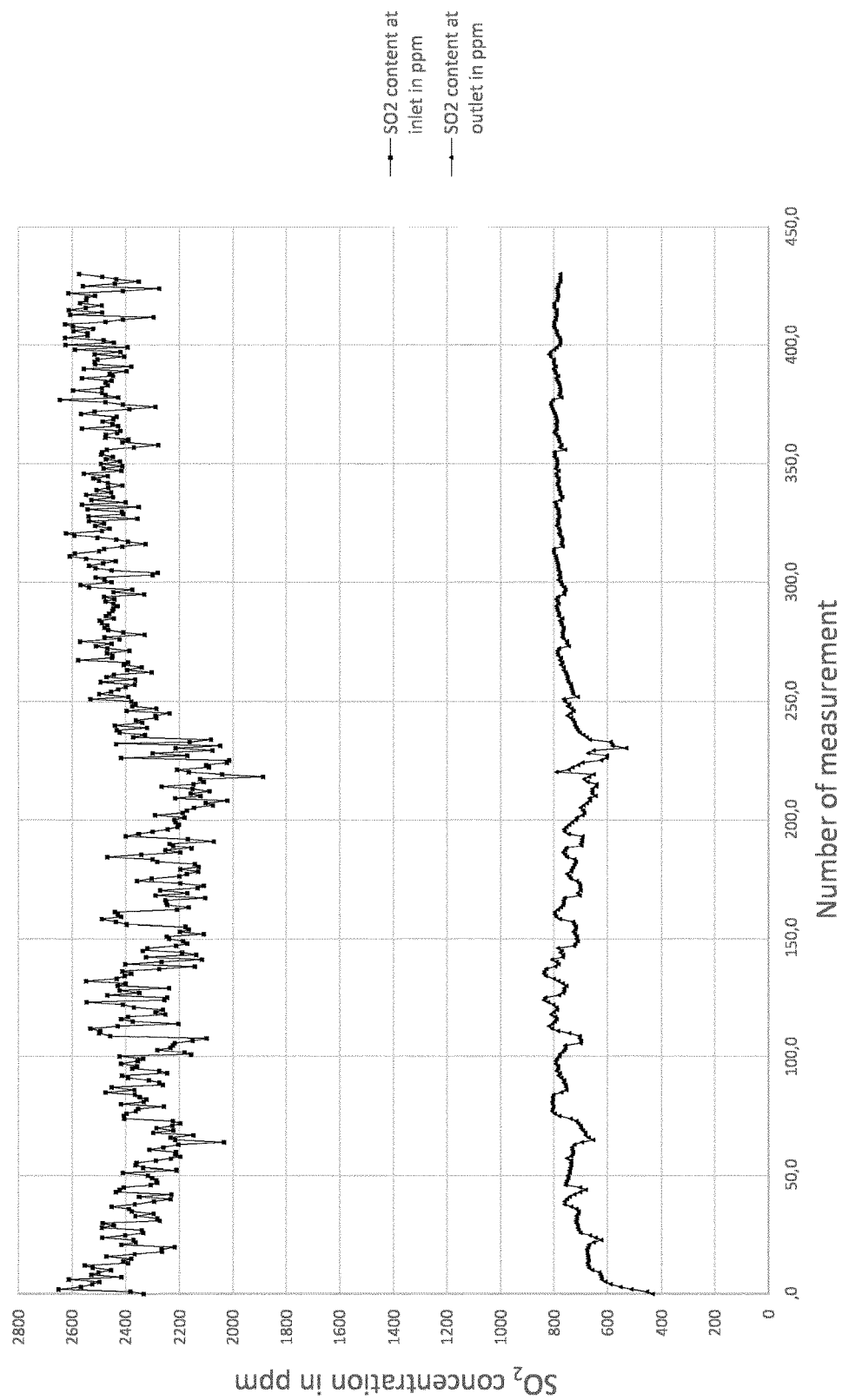

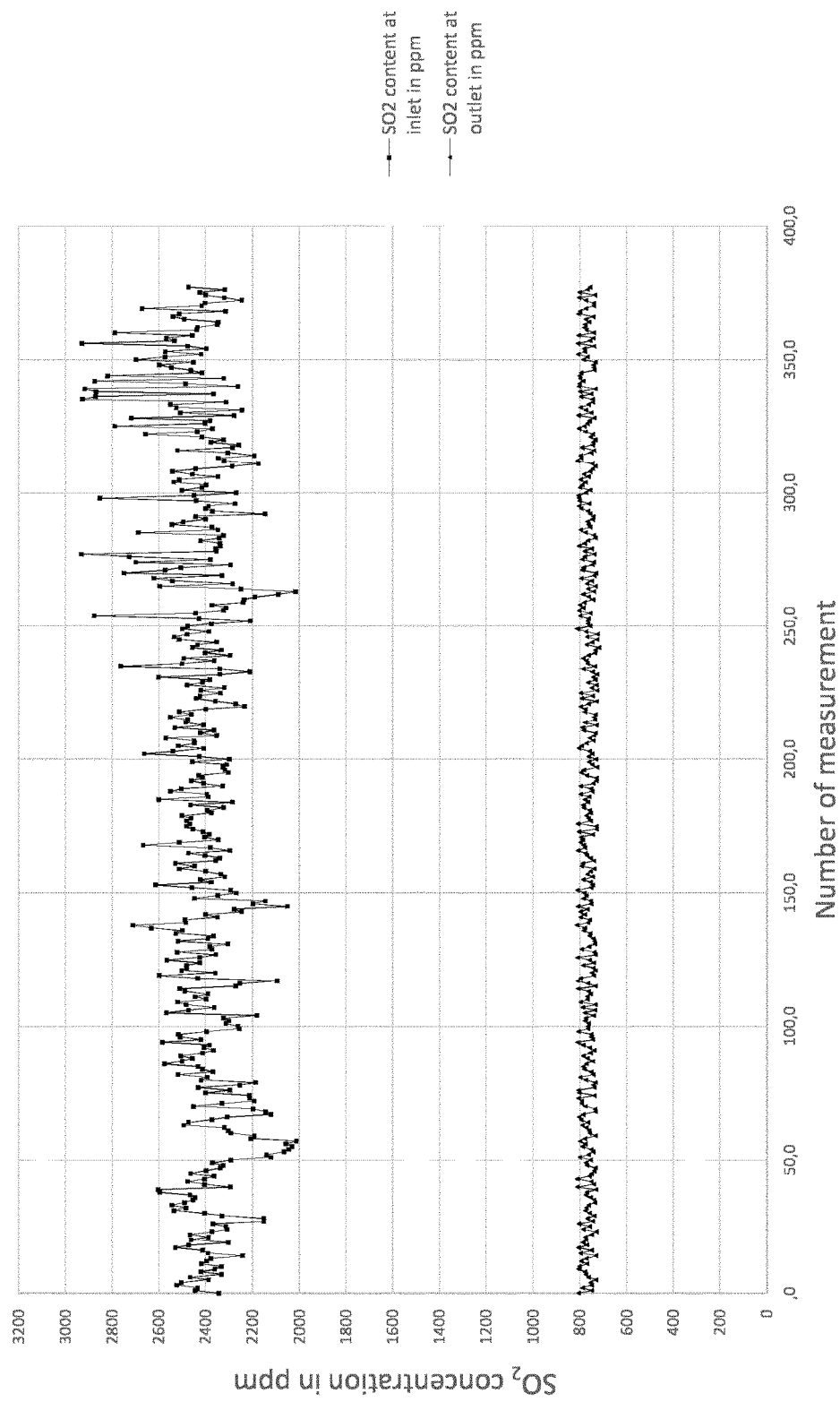

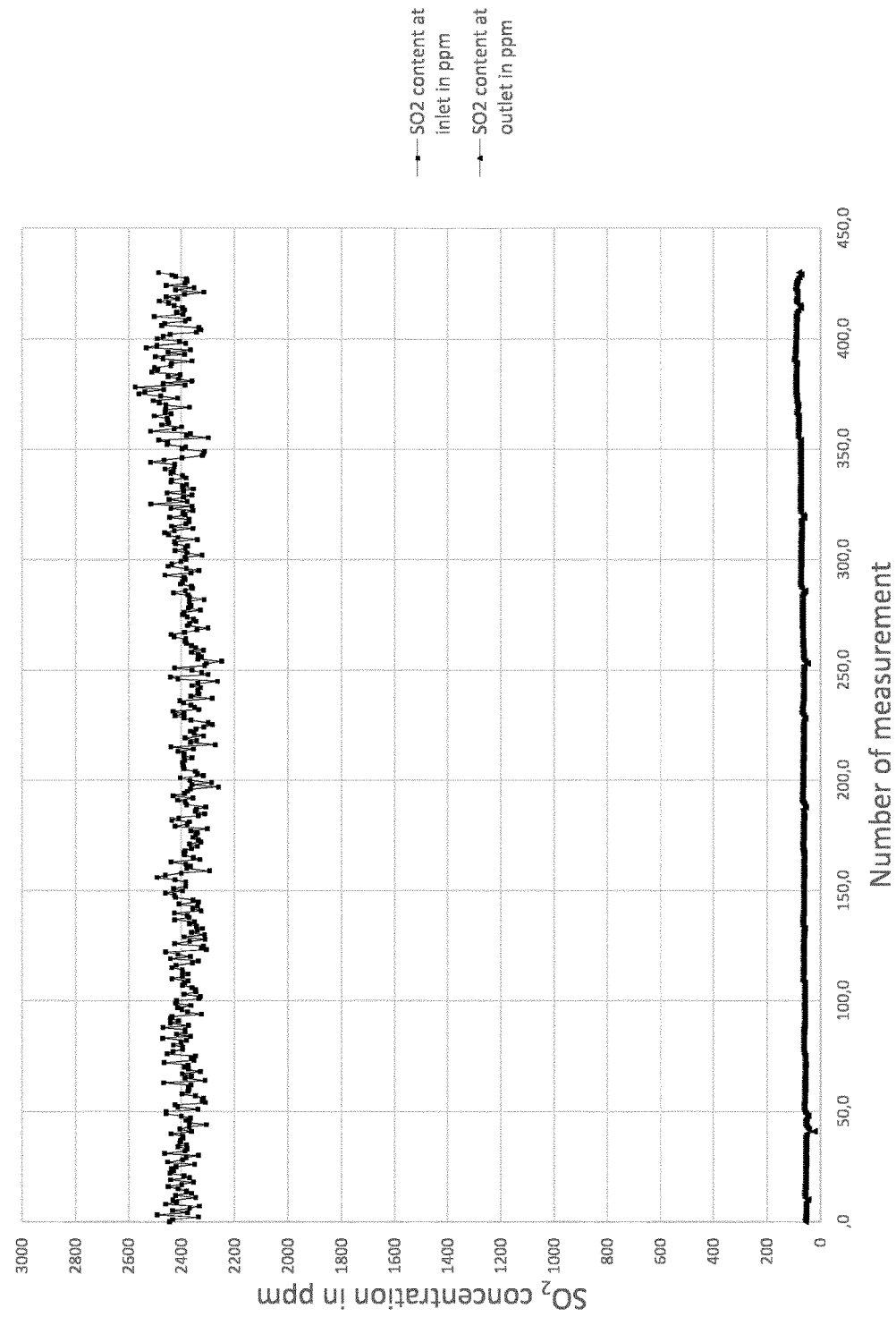

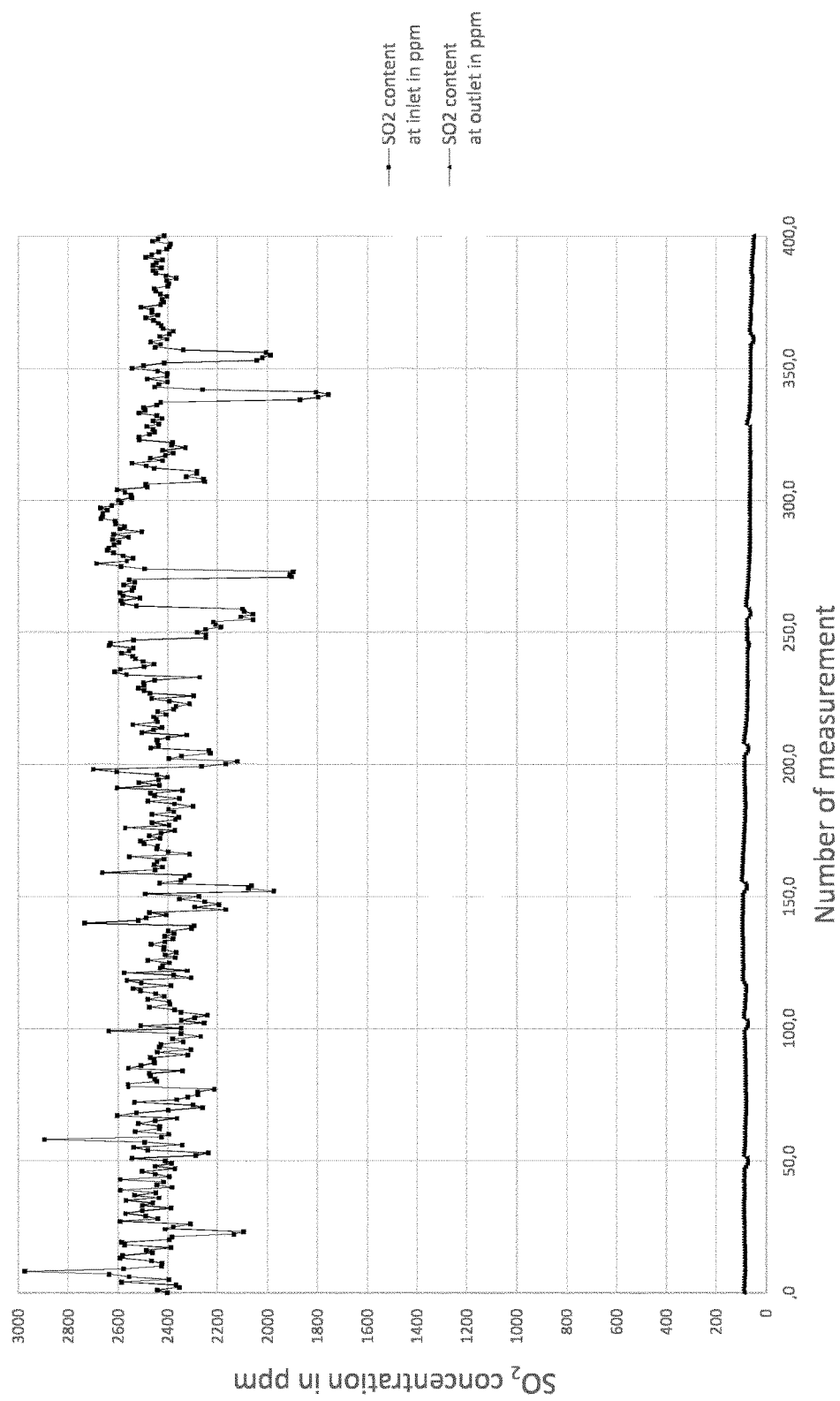

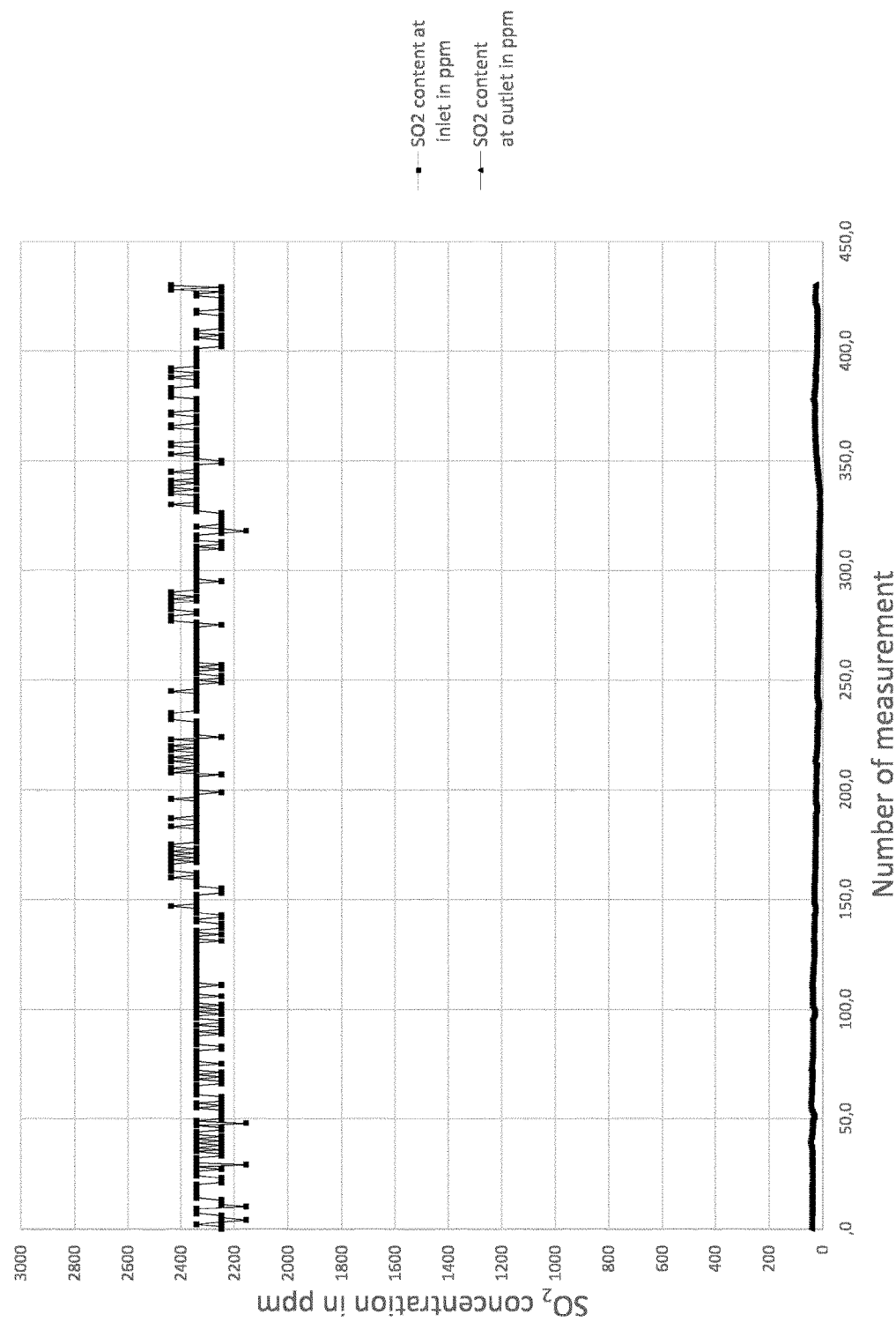

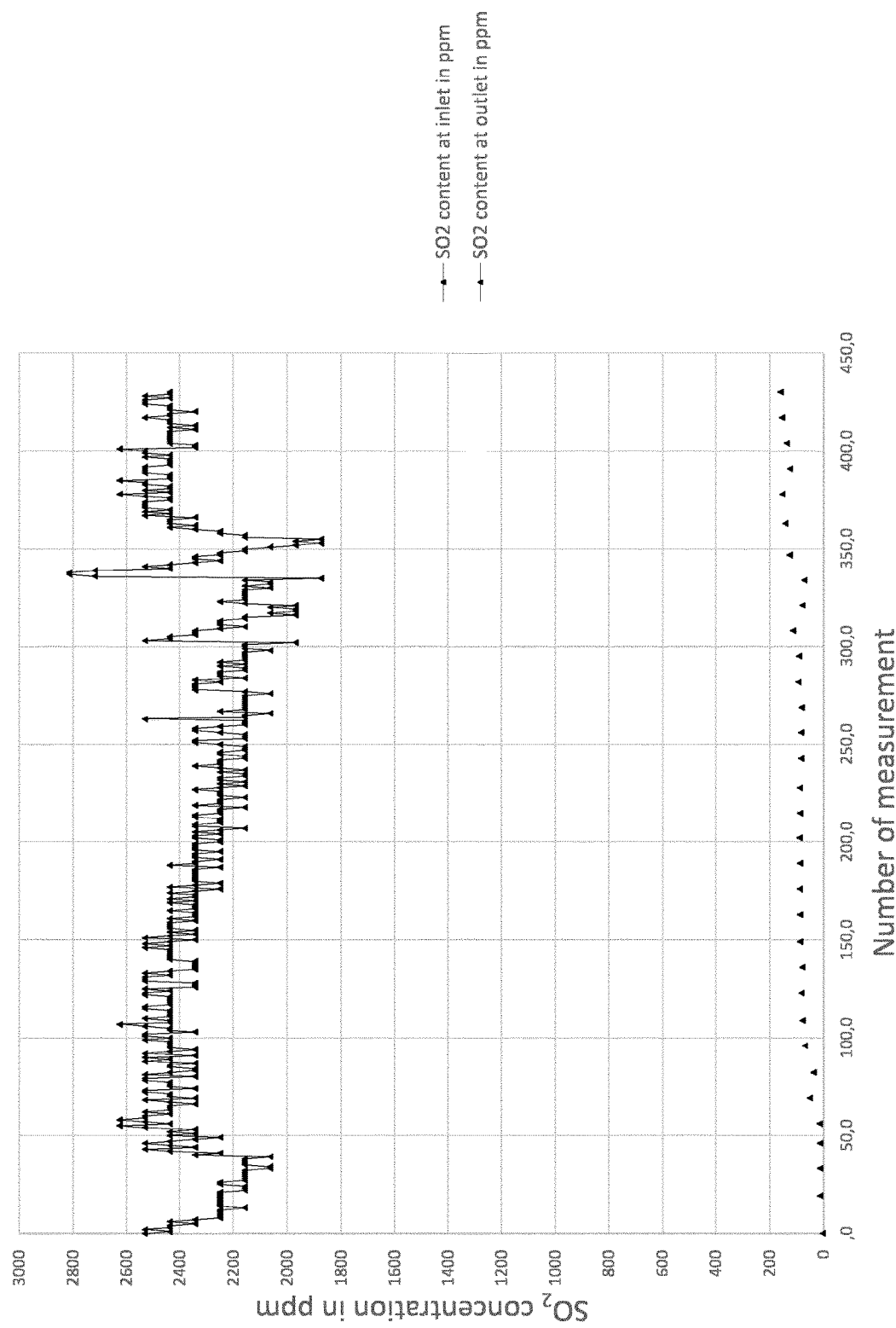

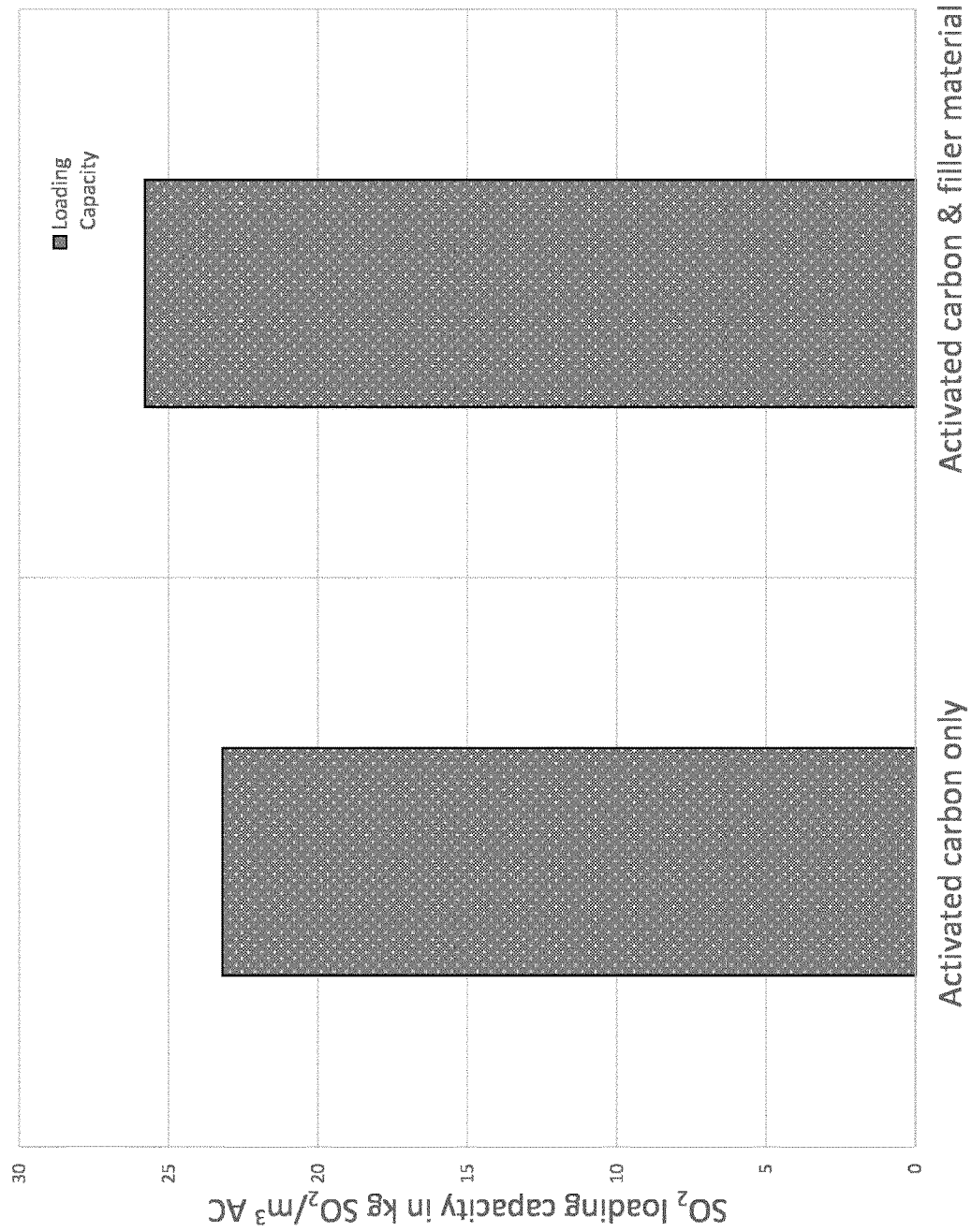

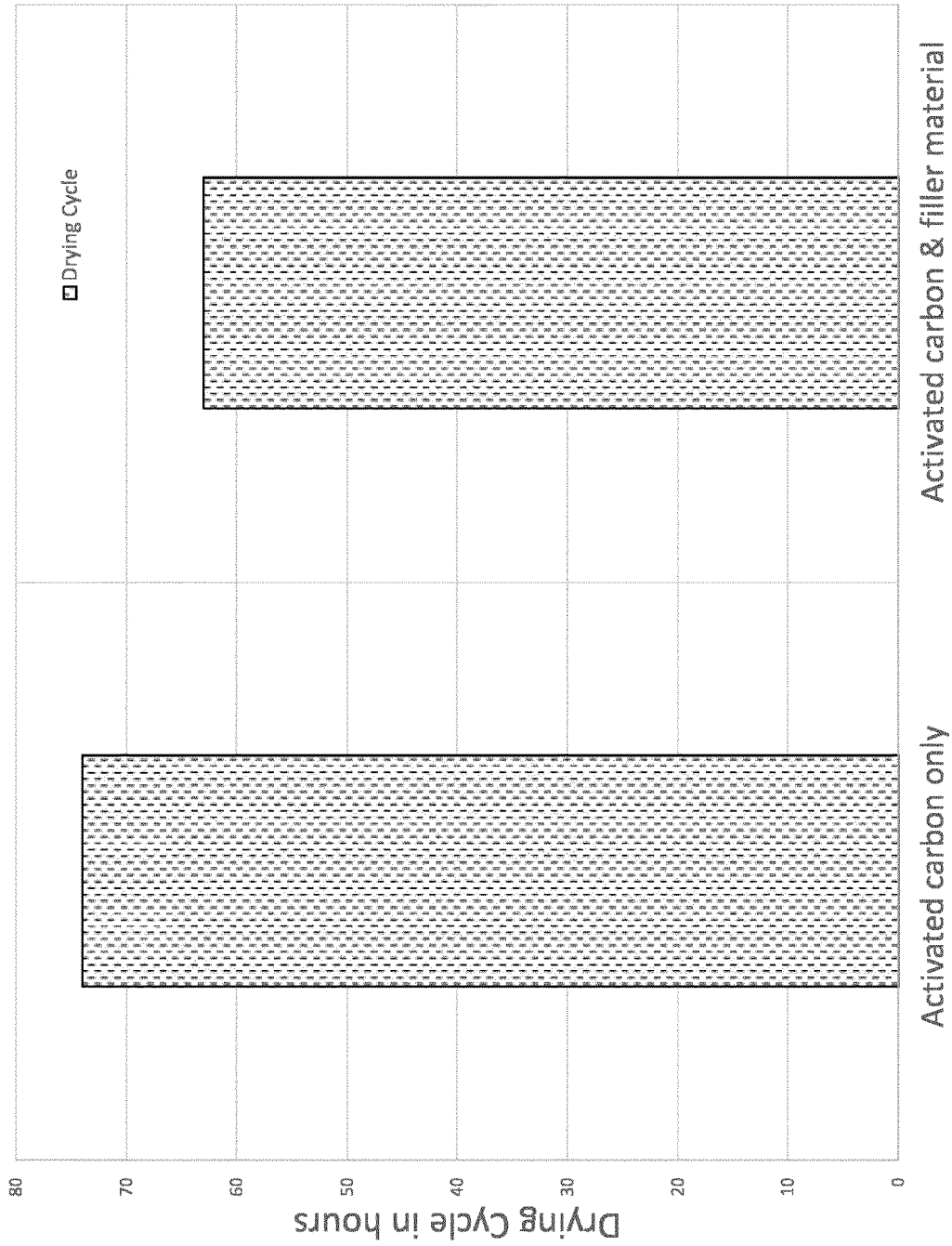

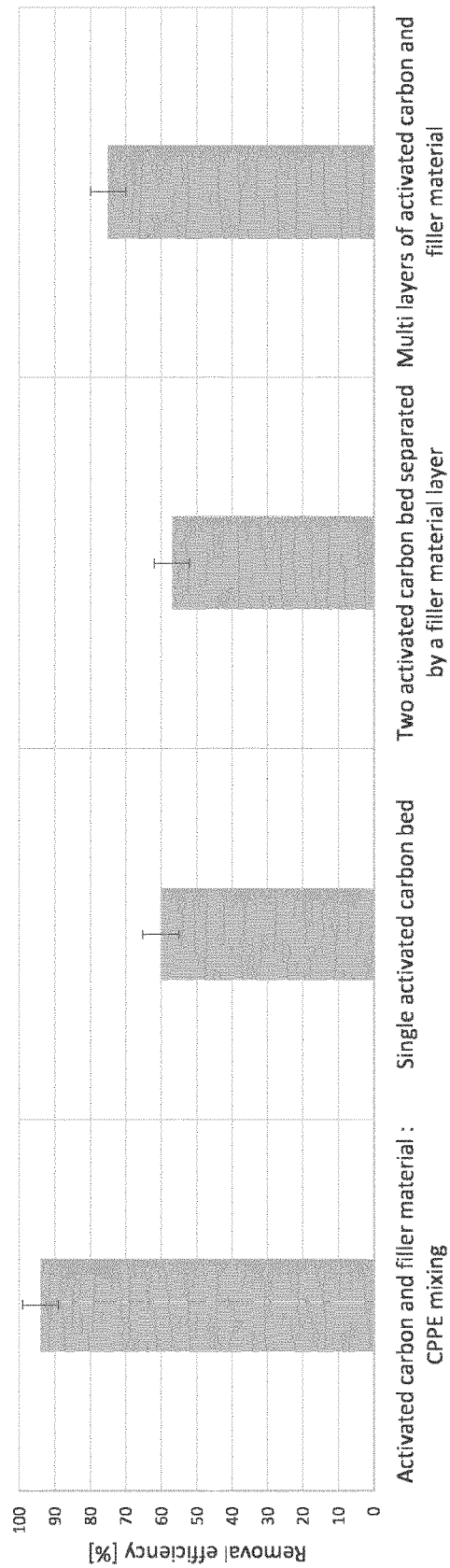
Fig. 10: Activated carbon and filler material mixture Bed design vs SO$_2$ removal performance

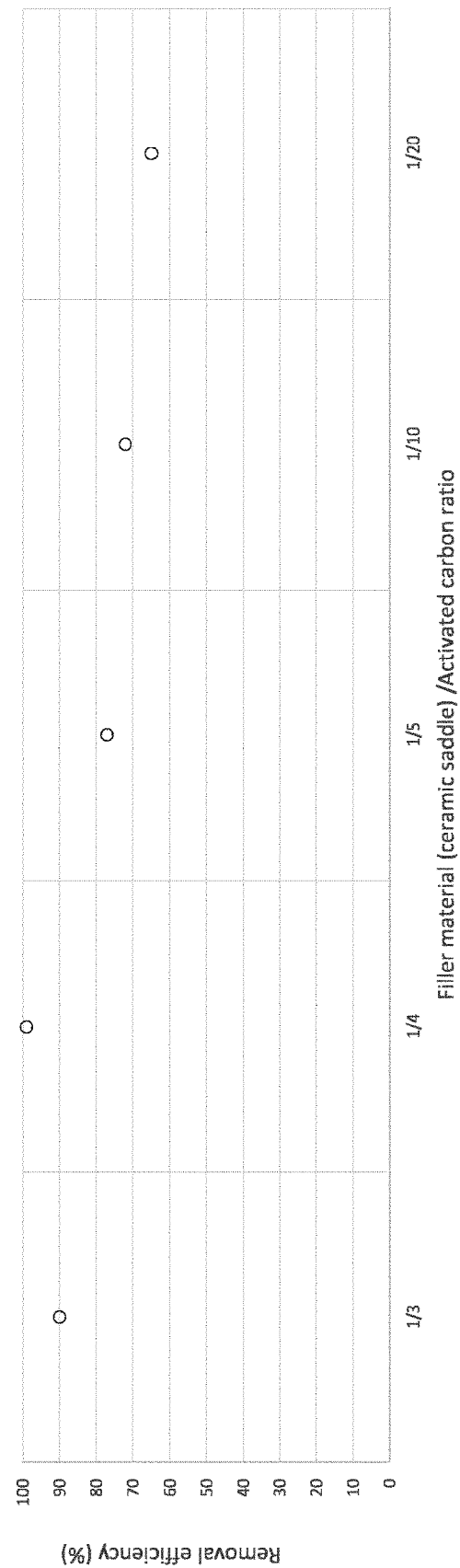

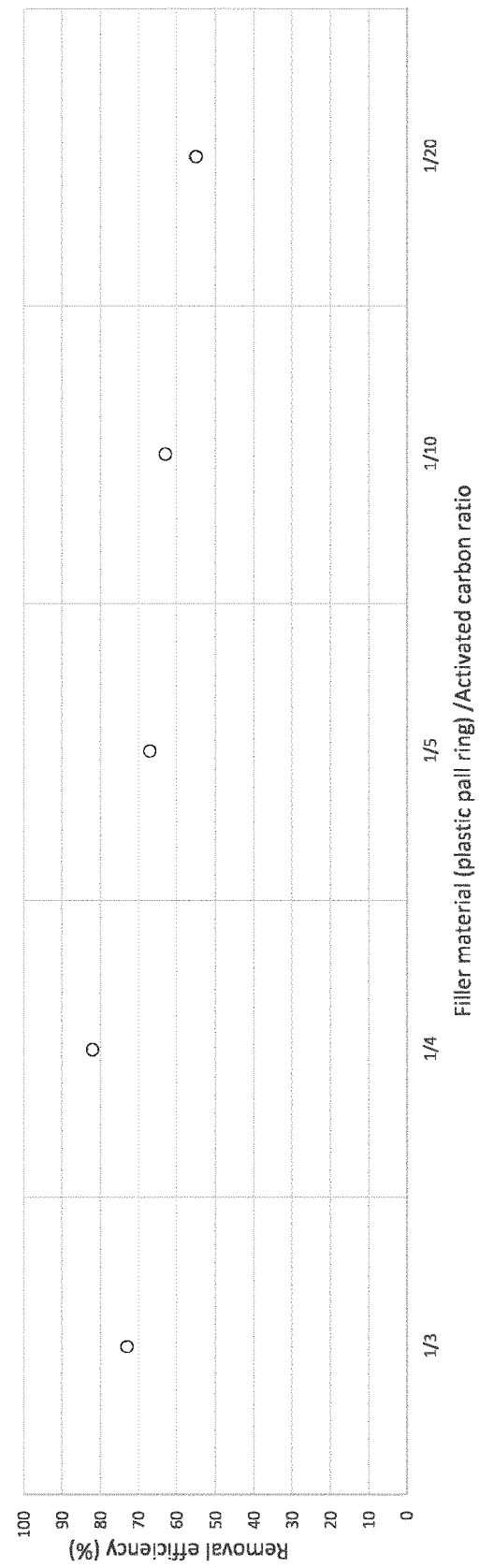

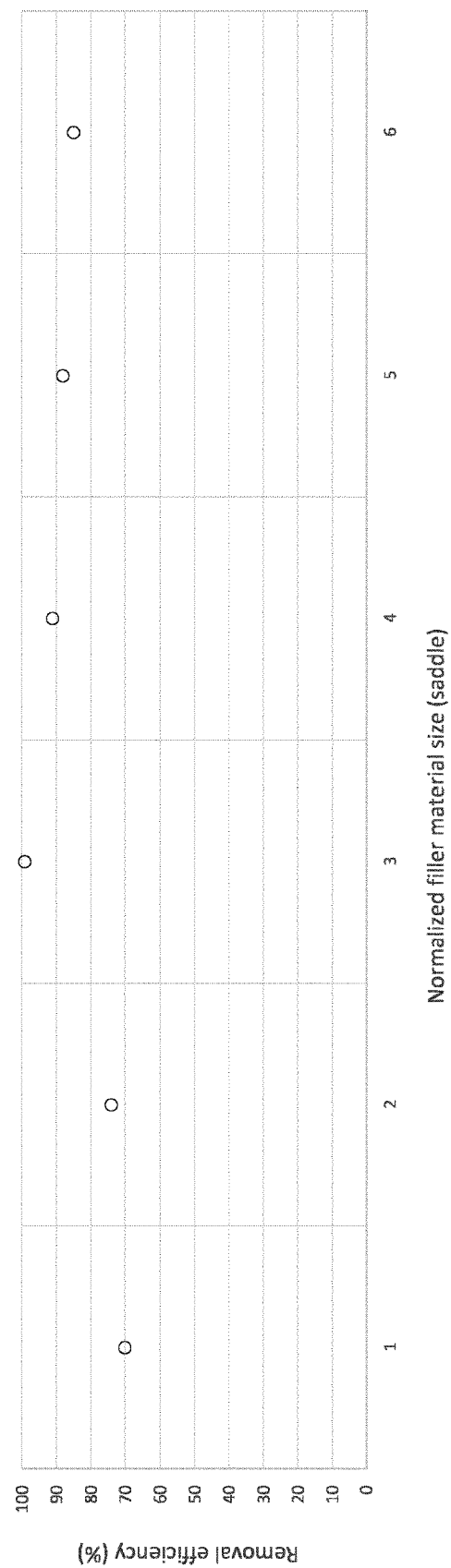

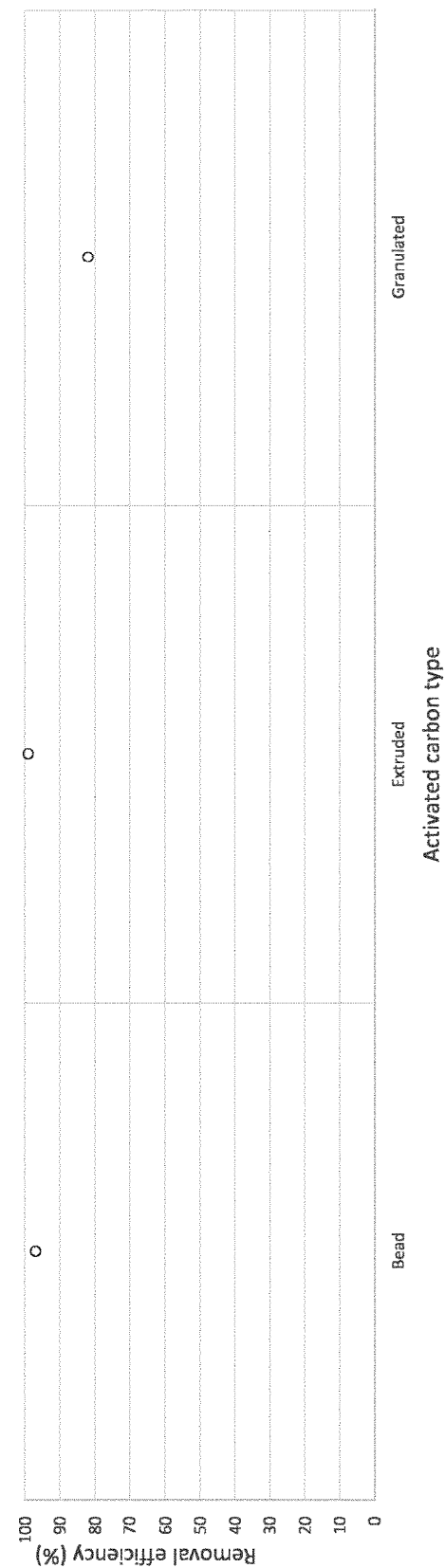

SULFUR DIOXIDE REMOVAL FROM WASTE GAS

TECHNICAL FIELD

The present disclosure generally relates to sulfur dioxide removal from waste gas generated by chemical and metallurgical processes.

BACKGROUND ART

A known method for sulfur dioxide removal from waste gas/flue gas is the Sulfacid® process. This process has been especially developed to meet the dual objectives of $SO_2$ removal from waste gases generated by chemical and metallurgical processes and transformation into industrial grade sulfuric acid. It lends itself particularly well to applications where sulfuric acid can be directly used, for example titanium dioxide production or similar sulfuric acid based processes. Additionally, the fixed activated carbon bed is able to remove heavy metals (such as Hg and Cd) from the waste gas.

Typical Waste Gas Inlet Parameters:

| | |
|---|---|
| $SO_2$ content | up to 1 vol. % |
| Hg content | 150 μg/Nm³ dry |
| $O_2$ content | min. 7 vol. % |
| Temperature | 50-80° C. |
| Dust content | <30 mg/m³ STP (all data refers to dry gas) |

Typical Clean Gas Outlet Parameters:

| | |
|---|---|
| $SO_2$ content | ≤50 mg/Nm³ dry |
| Hg content | 25 μg/Nm³ dry |

The raw gas flows through an activated carbon catalyst fixed bed inside a reactor. The $SO_2$ is converted to sulfuric acid by wet catalysis in the presence of oxygen and water. A water-saturated clean gas is discharged to atmosphere via a stack. The sulfuric acid collected in the pores and on the surface of the catalyst is intermittently washed out by spraying water over the catalyst. Clear industrial grade sulfuric acid of 10 to 50 wt. % strength is collected in a buffer tank. The conversion of sulfur dioxide to sulfuric acid on the catalyst works according to the following reaction equation:

$$SO_2 + \tfrac{1}{2}O_2 + nH_2O \Rightarrow H_2SO_4 \cdot (n-1)H_2O + heat$$

The first Sulfacid® plant was started-up in 1968; now a few hundred plants are in operation worldwide.

It has been found however that the process is less efficient for a higher $SO_2$ concentration in the flue gas. It has been found that using more catalyst does not lead to higher removal of $SO_2$.

EP0 302 224 uses for the removal of $SO_2$ in a gas a catalyst which is hydrophobized by means of hydrophobic polymer compounds such as polytetrafluoroethylene, polyisobutylene, polyethylene, polypropylene or polytrichlorfluorethylen, with a ratio of catalyst:hydrophobizing agent of 25:1 to 1:4.

EP2 260 940 uses for the removal of $SO_2$ in a gas a carbon based catalyst where iodine, bromine or compound thereof is added (ion exchanged or supported) and a water repellent treatment is applied to the carbon based catalyst to enhance the contact between the $SO_2$ gas and the flue gas to be treated, containing $SO_2$.

JPH11 236207 and JP3562551B2 also use a carbon catalyst treated with a water repellent of catalyst to enhance the contact between the $SO_2$ gas and the flue gas to be treated, containing $SO_2$.

BRIEF SUMMARY

The disclosure enhances the performance of the $SO_2$ removal from waste gases/flue gases generated by chemical and metallurgical processes and the transformation into industrial grade sulfuric acid.

In one embodiment, the disclosure proposes a process wherein a gas containing $SO_2$ and $O_2$ is brought into contact with a mixture of from 95% vol. to 50% vol. of activated carbon catalyst and from 5% vol. to 50% vol. of an inert filler material; wherein the mixture is a mixture of separate, distinct particles of filler and separate, distinct particles of activated carbon catalyst; wherein the $SO_2$ is converted to $H_2SO_4$ on the activated carbon catalyst and is then washed from the activated carbon catalyst to obtain a $H_2SO_4$ solution.

In a preferred embodiment the mixture is soaked by water or an acid or alkaline aqueous solution.

Alternatively the mixture is dry.

The gas used in the present process is a waste gas generated by chemical and metallurgical processes.

Surprisingly, the fact that the activated carbon catalyst is mixed with a filler material allows obtaining a more complete removal of $SO_2$ from the gas.

The activated carbon catalyst is preferably extruded and has a grain size of 0.80-130 mm. The activated carbon catalyst is preferably granulated and has a grain size: 0.30 to 4.75 mm.

In an embodiment the activated carbon catalyst is preferably a mixture of granulated and extruded catalyst.

The carbon catalyst may be produced from brown and bituminous coals, fruit pits, coconut shells, lignite, peat, wood, sawdust/sawchip, petroleum coke, bone and paper mill waste (lignin), synthetic polymers like PVC, rayon, viscose, polyacrylonitrile or phenols.

The carbon catalyst may be activated by:
 a physical treatment: heat, steam, oxygen, $CO_2$, air
 a chemical treatment: impregnation with acid, strong base or salts (e.g. sulfuric, chlorhydric or phosphoric acid, potassium or sodium hydroxide, calcium or zinc chloride)
 a combination of both a physical and a chemical treatment.

The activated carbon catalyst may have a specific surface area (BET): 400 to 1800 m²/g and an acid or alkaline pH.

In an embodiment, the filler material is between 10% vol. and 30% vol. of the mixture of activated carbon catalyst and a filler material.

Preferably at least 5% vol 6% vol, 7% vol, 8% vol, 9% vol, 10% vol, 11% vol, 12% vol, 13% vol, 14% vol, 15% vol, 16% vol, 17% vol, 18% vol, 19% vol, 20% vol, 21% vol, 22% vol, 23% vol, 24% vol, 25% vol, 26% vol, 27% vol, 28% vol, 29% vol, or at least 30% vol of filler are used in the mixture of activated carbon catalyst and a filler material.

Preferably at most 50% vol 49% vol, 48% vol, 47% vol, 46% vol, 45% vol, 44% vol, 43% vol, 42% vol, 41% vol, 40% vol, 39% vol, 38% vol, 37% vol, 36% vol, 35% vol, 34% vol, 33% vol, 32% vol, 31% vol, or at most 30% vol. of filler are used in the mixture of activated carbon catalyst and a filler material.

In an embodiment, the filler material may comprise an active catalyst material (e.g. V, Fe, Zn, Si, $Al_2O_3$, ... ).

The filler is preferably chosen from fillers made of ceramic material, made of metal, fillers made of plastic mineral or mixtures thereof. Preferably, the filler material comprises plastic, metals, alumina, ceramic materials or mixture thereof.

According to various embodiments, the filler material is a shape chosen among saddle shaped, ring shaped, ball shaped, torus shaped, prism shaped or irregular shaped.

In particular, fillers made of ceramic material, having a free volume of 50-79% may be used:
  i. Novalox® Saddle: 12.7-76.2 mm
  ii. Berl saddle: 4-50 mm
  iii. Cylindrical ring: 5-200 mm
  iv. Pall® ring: 25-100 mm
  v. Transitional grid lining
  vi. Cylindrical ring with 1 bar or 1 cross: 80-200 mm
  vii. Grid block: 215*145*90 mm In particular, fillers made of metal, having a free volume of 95-98% may be used:
  i. Cylindrical ring. 15-50 mm
  ii. Pall® ring: 15-90 mm
  iii. VSP®: 25-50 mm
  iv. Top-Pak®: 15 mm
  v. Novalox®-M: 15-70 mm
  vi. Twin-Pak®: 10-15 mm
  vii. Interpak®: 10-20 mm In particular, fillers made of plastic, having a free volume of 87-97% may be used:
  i. Novalox® saddle: 12.7-50.8 mm
  ii. Pall® ring: 15-90 mm
  iii. VSP®: 25-90 mm
  iv. Igel®: 40 mm
  v. Netball®: 45-90 mm The filler material is thus made up of distinct, individual particles that are added to the activated carbon catalyst to improve, to enhance some properties of the mixtured material. The filler material particles generally have a mean particle size (based on the average largest dimension (by number) of the particle) of more than 4 mm. Usually their mean particle size (based on the average largest dimension (by number) of the particle) is less than 200 mm.

In an embodiment, the mixture of activated carbon catalyst and a filler material contains no other solid ingredients than the activated carbon catalyst and the filler material. The total of these two ingredients makes thus 100% vol. of the mixture. It goes without saying that the mixture is a heterogeneous mixture since the components have a different particles sizes, different densities etc. The mixture comprises a mixture of separate, distinct particles of filler and separate, distinct particles of activated carbon catalyst. This makes it easy to separate the activated carbon catalyst from the filler when the activated carbon catalyst needs to be replaced.

The $SO_2$ removal is operated either as a so-called wet process or as a so-called dry process.

The wet process involves continuous rinsing/washing of the catalyst bed as described in DE 2 235 123.

In the dry process, the activated carbon catalyst is exposed to $SO_2$ until the conversion rate of $SO_2$ decreases, After this loading cycle, the supply of $SO_2$ is switched off and the catalyst is subjected to rinsing/washing with water or an aqueous solution and the $H_2SO_4$ is washed out. The catalyst is then dried and can be reused after this regeneration-cycle. Such methods are described in U.S. Pat. No. 3,486,852 or 4,122,150.

The present process can be used in an analogous way, either as a so-called wet process with a continuous rinsing/washing of the catalyst mixture or as a so-called dry process with a batch wise operation of a phase of loading the catalyst mixture with $SO_2$ and a phase of washing/rinsing/drying of the catalyst mixture. In the "dry process", the catalyst mixture is usually rinsed during 2 hours with a total of about 100 liters of water per m3 of mixture, i.e. about 50 l/hour/m³ of mixture. During the wet process, the mixture of activated carbon catalyst and a filler material is preferably washed with water or an aqueous solution in an amount between 5 l/hour/m³ of mixture and 100 l/hour/m³ of mixture.

The mixture of activated carbon catalyst and a filler material is preferably washed by intermittent spraying with water or an aqueous solution in counterflow to the gas.

The process is operated preferably at a pressure from 0.9 to 1.1 atm and more preferably at atmospheric pressure.

In the process as described the gas containing $SO_2$ and $O_2$ can be a waste gas generated by chemical and metallurgical processes. Its $SO_2$ content is typically between 300 ppm and 200,000 ppm.

The gas being brought into contact with the mixture of activated carbon catalyst and a filler material is usually at a temperature between 10° C. and 150° C.

The $O_2$ content of the gas is as a rule between 2 and 21% vol.

The $H_2SO_4$ content of the $H_2SO_4$ solution obtained is preferably between 5 and 50% vol. depending on the volume of water or aqueous solution used to rinse the mixture of activated carbon catalyst and a filler material.

Any heavy metals (such as Hg and Cd) are also removed from the gas during the process.

Any organic compounds are also removed from the gas in case of a dry process application.

BRIEF DESCRIPTION OF THE DRAWINGS

Further details and advantages of the disclosure can be taken from the following detailed description of a possible embodiment of the disclosure on the basis of the accompanying FIG. 1. In the drawings:

FIG. 2 is a graph showing the values measured during Test 1 of the $SO_2$ content of the waste gases at the inlet and outlet of the reactor;

FIG. 3 is a graph showing the values measured during Test 2 of the $SO_2$ content of the waste gases at the inlet and outlet of the reactor;

FIG. 4 is a graph showing the values measured during Test 3 of the $SO_2$ content of the waste gases at the inlet and outlet of the reactor;

FIG. 5 is a graph showing the values measured during Test 4 of the $SO_2$ content of the waste gases at the inlet and outlet of the reactor;

FIG. 6 is a graph showing the values measured during Test 5 of the $SO_2$ content of the waste gases at the inlet and outlet of the reactor;

FIG. 7 is a graph showing the values measured during Test 6 of the $SO_2$ content of the waste gases at the inlet and outlet of the reactor.

FIG. 8 is a graph showing the values measured during Test 7 and 8 of the $SO_2$ loading capacity of an active carbon catalyst and of a mixture of an active carbon catalyst and a filler.

FIG. 9 is a graph showing the values measured during Test 7 and 8 of the drying time of an active carbon catalyst and of a mixture of an active carbon catalyst and a filler.

FIG. 10 is a graph showing the removal efficiency of an active carbon catalyst alone and different ways of mixing an active carbon catalyst with filler in relation to Test 9a, b, c and d.

FIG. 11 is a graph showing the removal efficiency of an active carbon catalyst mixed with different quantities of a first filler material in relation to Test 10, FIG. 12 is a graph showing the removal efficiency of an active carbon catalyst mixed with different quantities of a second filler material in relation to Test 11, FIG. 13 is a graph showing the removal efficiency of an active carbon catalyst mixed with ¼ of different sized filler materials in relation to Test 12, FIG. 14 is a graph showing the removal efficiency of different types of active carbon catalyst mixed with ⅓ of filler materials in relation to Test 13,

DETAILED DESCRIPTION

Figure 1:
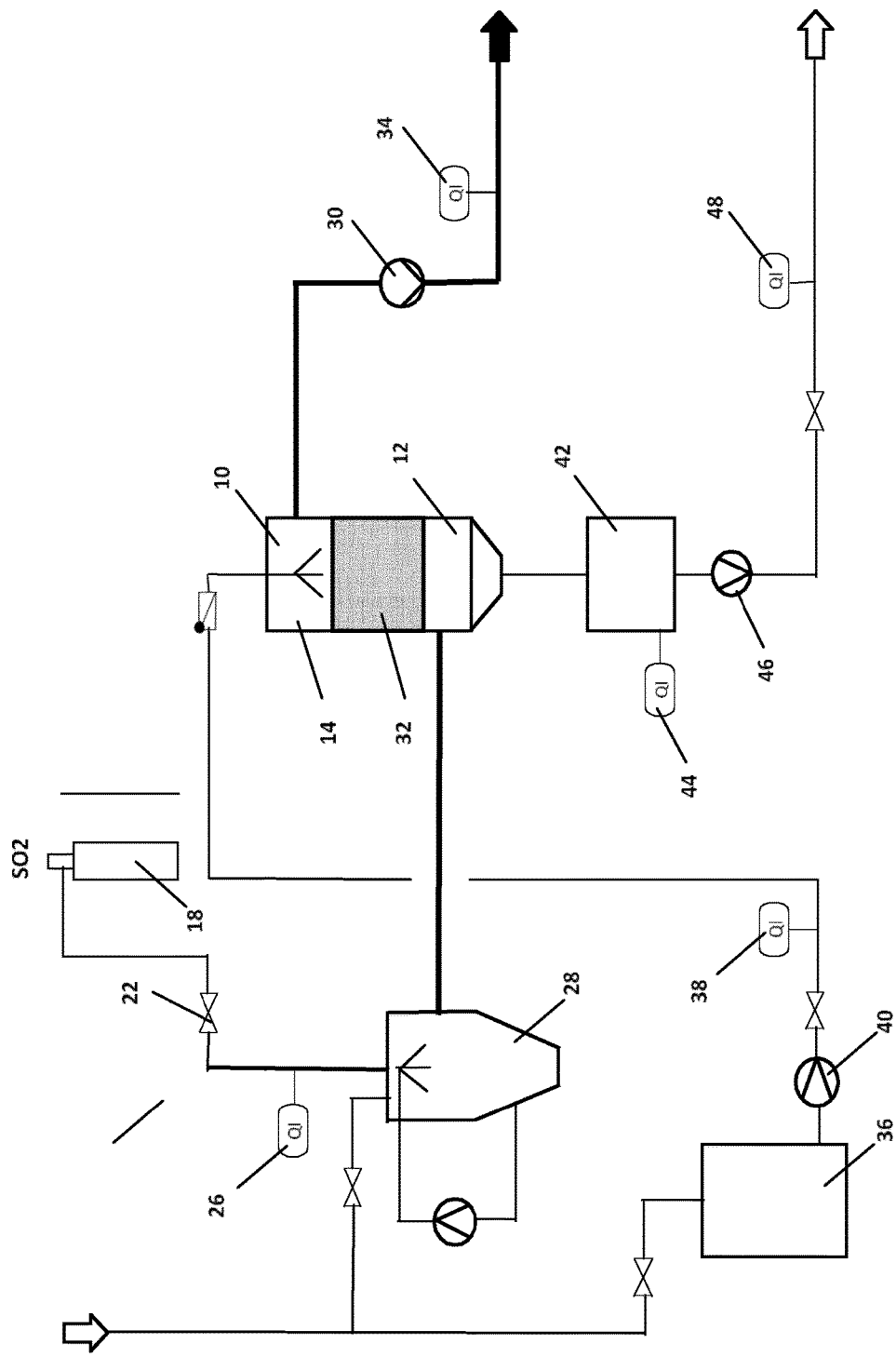
FIG. 1 is a schematic view of the arrangement.

The test arrangement shown in FIG. 1 in order to illustrate the disclosure comprises a test reactor 10, to the lower part 12 of which a test gas is supplied and in the upper part 14 of which water is sprayed.

For the purpose of these tests, instead of waste gas a test gas is used to simulate the waste gases. The test gas comprises ambient air which is used as is, at a temperature between 10-12° C. and to which $SO_2$ is subsequently added from a pressurized cylinder 18 via corresponding valve 22. A first measuring device 26 analyses the composition ($SO_2$ content, $O_2$ content), the temperature, the flow volume and the flow rate of the test gas.

The test gas is then cooled to saturation temperature in a quench 28 by evaporation of water. The test gas is drawn via the quench 28 into the reactor 10 by a fan 30. A coalescer, a droplet separator or a mist collector at the outlet of the quench 28 collects any droplets that might be contained in the test gas as it exits from the quench.

The test gas flows through the reactor 10 and through the activated carbon catalyst or the filling material or a combination of an activated carbon catalyst and filling material 32 arranged inside the test reactor 10. The test gas flows from the bottom to the top of the reactor 10 and is then examined once it is discharged from the test reactor 10 in a second measuring device 34 for the same parameters as in the first measuring device 26, i.e. composition ($SO_2$ content, $O_2$ content), the temperature, the flow volume and the flow rate, and is then released into the atmosphere.

The water required in the process is fed from a storage container 36 via a metering device 38, where the flow is measured, and a pump 40 into the upper part 14 of the test reactor 10, where the water flows through the activated carbon catalyst or the filling material or a combination of activated carbon and filling material 32 in counterflow to the test gas.

Alternatively however, the water required in the process can also be fed through the reactor in co-current flow with, i.e. in the same direction as, the test gas. The selection of a co-current or counterflow method depends for example on the local conditions.

The water required for the quench 28 comes directly from the water supply and is circulated within the quench.

The $SO_2$ is catalytically converted into $SO_3$ on the activated carbon catalyst, and is then converted into sulfuric acid if water is added.

The filling material is randomly mixed with the activated carbon catalyst and the mixture is located above the sieve i.e. a metallic mesh sieve with mesh inferior to the particle size of the mixture of catalyst and filler (e.g. >2 mm.

The sulfuric acid formed is rinsed off from the activated carbon catalyst by intermittent spraying with water, as a function of the volume of the catalyst and of the $SO_2/SO_3$ concentration, in counterflow to the gas.

The presence of filling material surprisingly improves the conversion efficiency during $SO_2$ catalytic reaction and/or during spraying with water due to liquid/gas interaction. The presence of the filling material seems to enhance the liquid and gas flows as well as their repartition through the catalyst bed that allows a more uniform liquid and gas coverage of each catalyst grain and thus a higher $SO_3$ to $H_2SO_4$ conversion. Indeed the regeneration of the activated carbon during dry process is quicker and more efficient leading to a shorter regeneration-cycle time.

It has been found that there is a
Good fluid distribution
Low pressure drop in the reactor
Less temperature gradient
These main parameters may explain the better performance of the system.

The filler material may optionally be impregnated as stated before.

In the test reactor described above, spraying with water was carried out 1-4 times/hour using an amount of water of 12.5-125 l/hour/m³ of mixture. The water is collected in a container 42 in the lower part 12 of the test reactor 10 together with the aqueous sulfuric acid solution produced during the process. The acid content is determined by means of a measuring device 44. The sulfuric acid solution is then pumped off by a pump 46 and the flow volume is ascertained using a further measuring device 48.

In the system described above, the sulfur dioxide of the waste gases is catalytically converted via $SO_3$ on wet catalyst particles to form sulfuric acid. The method was tested successfully under the following conditions:
Water saturation of the waste gases before entry into the reactor by quenching.
$SO_2$ content of the flue gases between 300 ppm and 6000 ppm.
Gas temperature between 10 and 12° C.
$O_2$ content approximately 20% by volume.
Water saturation and eventually cooling of the waste gases by quenching.

Tested catalysts were provided by CABOT NORIT Nederland B.V. of Postbus 105 NL-3800 AC Amersfoot and Jacobi Carbons GmbH Feldbergstrasse 21 D-60323 Frankfurt/Main under the names Norit®_RST-3, respectively JACOBI_EcoSorb® VRX-Super. These catalysts are an extruded wood/charcoal based activated carbon catalysts with a particle size of about 3 mm. The following general properties are guaranteed by the manufacturer: iodine number 900-1200 mg/g; inner surface (BET) 1000-1300 m2/g; bulk density 360-420 kg/m3; ash content 6-7% by weight; pH alkaline; moisture (packed) 5% by weight.

It must be noted that the active carbon catalysts do not contain:
a. any iodine, bromine or a compound thereof,
b. any water repellent
c. any catalytically active metals such as Platinum, Palladium, Rhodium etc. or
d. any organic/catalytically active metal complexes based on metals such as Platinum, Palladium, Rhodium etc.

The active carbon catalyst is not hydrophobized by means of hydrophobic polymer compounds such as polytetrafluoroethylene, polyisobutylene, polyethylene, polypropylene or polytrichlorfluorethylen. In the tests, flue gas analyzers of a German company named Testo were used. The devices were calibrated by the manufacturer. In addition, the analysis data of these flue gas analyzers was confirmed by wet-chemical measurements carried out in parallel. The results of all measurements fell within the admissible deviation tolerances.

The progression of the $SO_2$ conversion by $H_2SO_4$ on the catalyst surface corresponds to the following total formula:

$$SO_2 + \tfrac{1}{2} O_2 + nH_2O \text{(catalytically)} \rightarrow H_2SO_4 + (n-1)H_2O$$

Without wanting to be committed to a particular theory, it is assumed that:

- $O_2$ and $SO_2$ migrate toward the active centers of the catalyst where they are converted into $SO_3$.
- $SO_3$ migrates out from the active centers of the catalyst and forms $H_2SO_4$ with the aqueous covering around the catalyst core.
- $SO_2$ reacts with oxygen and water to form sulfuric acid in accordance with the reaction equation above.

The filling material mixed with activated carbon catalyst enables an optimal liquid and gas interaction with catalyst active sites.

Softened or demineralized water is used to wash out the catalyst.

The specific level of $SO_2$ saturation achieved in the pores of the catalyst in respect of the sulfuric acid formation occurs in the reactor once sufficient $SO_2$ has been converted into $SO_3$ and starts to form sulfuric acid.

Such a condition is reached after approximately 20 to 100 operating hours depending on the approach adopted (amount of $SO_2/SO_3$ fed and corresponding water spraying rate). The percentage by weight of acid produced is independent of the duration—i.e. the time of contact between the gas and the catalyst. The $SO_2$ to $H_2SO_4$ conversion is dependent on the $SO_2$ to $SO_3$ conversion efficiency and on the amount of water or aqueous solution used. For this reason, this process can produce solutions with different percentages by weight of sulfuric acids ($H_2SO4$).

Test 1: (Comparative Test) The tests were carried out under the following conditions:

| Raw gas volume flow | min. | 200 m³/h |
|---|---|---|
| | max. | 300 m³/h |
| $SO_2$ content (inlet) | min. | 2000 ppm |
| | max. | 3000 ppm |
| Gas temperature | min. | 10° C. |
| | max. | 12° C. |
| Relative Humidity of the gas | | 100% |
| $O_2$ content | | >20% by volume |

The reactor is made of inert glass fiber reinforced plastics material, has a volume of approximately 2 m³ and is filled with 1.2 m³ of an activated carbon catalyst of the Norit®_RST-3 type.

In a first phase the test system was run for approximately 50 hours with the addition of $SO_2$ from gas cylinders, and in this instance between 2,000 and 3,000 ppm of $SO_2$ were added. Overall, the reactor was charged with approximately 88 kg of $SO_2$ (approximately 73 kg of $SO_2/m^3$ of catalyst bed). In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 2. The first measurements shown in this case were taken after saturation of the catalyst, i.e. 50 hours after start-up of the reactor. The $SO_2$ outlet concentration fluctuated repeatedly between 600 ppm and 900 ppm, with a $SO_2$ removal efficiency of 66%. The test was carried out continuously over approximately 9 hours.

Test 2: The tests were carried out under the following conditions:

| Raw gas volume flow | min. | 200 m³/h |
|---|---|---|
| | max. | 300 m³/h |
| $SO_2$ content (inlet) | min. | 2000 ppm |
| | max. | 3000 ppm |
| Waste gas temperature | min. | 10° C. |
| | max. | 12° C. |
| % of relative humidity | | 100% |
| $O_2$ content | | >20% by volume |

The reactor is made of inert glass fiber reinforced plastics material, has a volume of approximately 2 m3 and is filled with 1.2 m3 of an activated carbon catalyst of the JACOBI_EcoSorb® VRX-Super type.

Contrary to the test 1, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 3. The first measurements shown in this case were taken directly after start-up of the reactor. The $SO_2$ outlet concentration fluctuated repeatedly between 600 ppm and 900 ppm with a $SO_2$ removal efficiency of 64%. The test was carried out continuously over approximately 6 hours.

Test 3: The tests were carried out under the following conditions:

| Raw gas volume flow | min. | 200 m³/h |
|---|---|---|
| | max. | 300 m³/h |
| $SO_2$ content (inlet) | min. | 2000 ppm |
| | max. | 3000 ppm |
| Waste gas temperature | min. | 10° C. |
| | max. | 12° C. |
| % of relative humidity | | 100% |
| $O_2$ content | | >20% by volume |

The reactor is made of inert glass fiber reinforced plastics material, has a volume of approximately 2 m³ and is filled with 1.2 m³ of an activated carbon catalyst of the Norit®_RST-3 type modified by randomly mixing with 0.27 m³ of a ceramic filling material (Novalox® saddle Acidur-Special-Stoneware supplied by Vereinigte Füllkörper-Fabriken).

Like the test 2, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 4. The first measurements shown in this case were taken directly after start-up of the reactor. The $SO_2$ outlet concentration fluctuated repeatedly between 15 ppm and 95 ppm with a $SO_2$ removal efficiency of 96%. The test was carried out continuously over approximately 7 hours.

Test 4: The tests were carried out under the following conditions:

| Raw gas volume flow | min. | 200 m³/h |
|---|---|---|
| | max. | 300 m³/h |
| SO₂ content (inlet) | min. | 2000 ppm |
| | max. | 3000 ppm |
| Waste gas temperature | min. | 10° C. |
| | max. | 12° C. |
| % of relative humidity | | 100% |
| O₂ content | | >20% by volume |

The reactor is made of inert glass fiber reinforced plastics material, has a volume of approximately 2 m³ and is filled with 1.2 m³ of an activated carbon catalyst of the JACO-BI_EcoSorb® VRX-Super type modified by randomly mixing with 0.27 m³ of a ceramic filling material (Novalox® saddle Acidur-Special-Stoneware supplied by Vereinigte Füllkörper-Fabriken).

Like the test 2, the reactor was charged immediately when running with the addition of SO₂ from gas cylinders, and in this instance between 2,000 and 3,000 ppm of SO₂ were added. In accordance with this test, the addition of water at 15 l/hour was divided into 2 portions/hour (10.2 l/hour/m³ of catalyst bed). The SO₂ content of the waste gases was measured at the inlet and at the outlet of the reactor, as illustrated in FIG. 1. The measurements were taken every 30 seconds and are shown in graphs in FIG. 5. The first measurements shown in this case were taken directly after start-up of the reactor. The SO₂ outlet concentration fluctuated repeatedly between 15 ppm and 92 ppm with a SO₂ removal efficiency of 97%. The test was carried out continuously over approximately 7 hours.

Test 5: The tests were carried out under the following conditions:

| Raw gas volume flow | min. | 200 m³/h |
|---|---|---|
| | max. | 300 m³/h |
| SO₂ content (inlet) | min. | 2000 ppm |
| | max. | 3000 ppm |
| Waste gas temperature | min. | 10° C. |
| | max. | 12° C. |
| % of relative humidity | | 100% |
| O₂ content | | >20% by volume |

The reactor is made of inert glass fiber reinforced plastics material, has a volume of approximately 2 m³ and is filled with 1.2 m³ of an activated carbon catalyst of the Norit®_RST-3 type modified by randomly mixing with 0.27 m³ of a ceramic filling material (Novalox® saddle Acidur-Special-Stoneware supplied by Vereinigte Füllkörper-Fabriken).

Like the test 2, the reactor was charged immediately when running with the addition of SO₂ from gas cylinders, and in this instance between 2,000 and 3,000 ppm of SO₂ were added. In accordance with this test, the addition of water at 71 l/hour was divided into 2 portions/hour (48.3 l/hour/m³ of catalyst bed). The SO₂ content of the waste gases was measured at the inlet and at the outlet of the reactor, as illustrated in FIG. 1. The measurements were taken every 30 seconds and are shown in graphs in FIG. 6. The first measurements shown in this case were taken directly after start-up of the reactor. The SO₂ outlet concentration fluctuated repeatedly between 9 ppm and 43 ppm, with a SO₂ removal efficiency of 98%. The test was carried out continuously over approximately 4 hours.

Test 6: The tests were carried out under the following conditions:

| Raw gas volume flow | min. | 200 m³/h |
|---|---|---|
| | max. | 300 m³/h |
| SO₂ content (inlet) | min. | 2000 ppm |
| | max. | 3000 ppm |
| Waste gas temperature | min. | 10° C. |
| | max. | 12° C. |
| % of relative humidity | | 100% |
| O₂ content | | >20% by volume |

The reactor is made of inert glass fiber reinforced plastics material, has a volume of approximately 2 m³ and is filled with 1.2 m³ of an activated carbon catalyst of the Norit®_RST-3 type modified by randomly mixing with 0.27 m³ of a plastic filling material (Pall®-V-ring supplied by Vereinigte Füllkörper-Fabriken).

Like the test 2, the reactor was charged immediately when running with the addition of SO₂ from gas cylinders, and in this instance between 2,000 and 3,000 ppm of SO₂ were added. In accordance with this test, the addition of water at 15 l/hour was divided into 2 portions/hour (10.2 l/hour/m³ of catalyst bed). The SO₂ content of the waste gases was measured at the inlet and at the outlet of the reactor, as illustrated in FIG. 1. The measurements were taken every hours and are shown in graphs in FIG. 7. The first measurements shown in this case were taken directly after start-up of the reactor. The SO₂ concentration fluctuated repeatedly between 90 ppm and 160 ppm, with a SO₂ removal efficiency of 95%. The test was carried out continuously over approximately 30 hours.

Test 7: The tests were carried out under the following conditions:

| Raw gas volume flow | min. | 200 m³/h |
|---|---|---|
| | max. | 300 m³/h |
| SO₂ content (inlet) | min. | 18000 ppm |
| | max. | 22000 ppm |
| Waste gas temperature | min. | 10° C. |
| | max. | 12° C. |
| % of relative humidity | | <10% |
| O₂ content | | >18% by volume |

The reactor is made of inert glass fiber reinforced plastics material, has a volume of approximately 2 m³ and is filled with 1.2 m³ of an activated carbon catalyst of the Norit®_RST-3 type.

The quench was switched off during this test and dried activated carbon is used.

Like the test 2, the reactor was charged immediately when running with the addition of SO₂ from gas cylinders, and in this instance between 18,000 and 22,000 ppm of SO₂ were added without addition of water during the SO₂-loading phase. The SO₂ content of the waste gases was measured at the inlet and at the outlet of the reactor, as illustrated in FIG. 1. The measurements were taken each minute. The SO₂ concentration fluctuated repeatedly between 18000 ppm and 22000 ppm, with a SO₂ removal efficiency of more than 99%. The test was carried out over approximately 106 minutes until SO₂ outlet was higher than 100 ppm. The SO₂-loading efficiency was 23 kg of SO₂ per cubic meter of activated carbon. After this SO₂-loading step, the activated carbon was washed continuously for two hours through addition of water at 50 l/hour. In a next step, ambient air, heated at 80° C., is pulled through the catalytic bed and the activated carbon is dried after a time period of 74 hours.

Test 8: The tests were carried out under the following conditions:

| Raw gas volume flow | min. | 200 m³/h |
|---|---|---|
| | max. | 300 m³/h |
| SO₂ content (inlet) | min. | 18000 ppm |
| | max. | 22000 ppm |
| Waste gas temperature | min. | 10° C. |
| | max. | 12° C. |
| % of relative humidity | | <10% |
| O₂ content | | >18% by volume |

The reactor is made of inert glass fiber reinforced plastics material, has a volume of approximately 2 m³ and is filled with 1.2 m³ of an activated carbon catalyst of the Norit®_RST-3 type modified by randomly mixing with 0.27 m³ of a ceramic filling material (Novalox® saddle Acidur-Special-Stoneware supplied by Vereinigte Füllkörper-Fabriken).

The quench was switched off during this test and dried activated carbon is used.

Like the test 2, the reactor was charged immediately when running with the addition of $SO_2$ from gas cylinders, and in this instance between 18,000 and 22,000 ppm of $SO_2$ were added without addition of water during the $SO_2$-loading phase. The $SO_2$ content of the waste gases was measured at the inlet and at the outlet of the reactor, as illustrated in FIG. 1. The measurements were taken each minute. The $SO_2$ concentration fluctuated repeatedly between 18000 ppm and 22000 ppm, with a $SO_2$ removal efficiency of more than 99%. The test was carried out over approximately 117 minutes until $SO_2$ outlet was higher than 100 ppm. The $SO_2$-loading efficiency was 26 kg of $SO_2$ per cubic meter of activated carbon. After this $SO_2$-loading step, the activated carbon was washed continuously for two hours through addition of water at 50 l/hour. In a next step, ambient air, heated at 80° C., is pulled through the catalytic bed and the activated carbon is dried after a time period of 63 hours.

All the above tests have been carried out with 1.2 m³ of catalyst (activated carbon). In the tests carried out with addition of filler (whatever its shape): 0.27 m³ of filler were added to the initial 1.2 m³ of catalyst.

Vol % of the filler=0.27/(0.27+1.2)*100=18.36% vol.

A positive effect of the filler can be measured between 5% vol filler and 50% filler, the remaining being activated carbon catalyst.

The surprising effect is that the removal of $SO_2$ is more efficient when the catalyst is mixed with fillers than the catalyst alone since more $SO_2$ is converted with the same amount of catalyst as shown in FIG. 10.

In addition in case of dry process conditions, the $SO_2$-loading capacity of activated carbon is higher and the regeneration cycle is shorter in case the activated carbon is mixed with fillers as shown in FIG. 8 and in FIG. 9.

In the tests conducted it was found that ceramic filler material having a saddle shape seem to be the most efficient. Saddle shape means in the context of the present disclosure: shaped in the form of a horse's saddle, a shape that is bent down at the sides so as to give the upper part a rounded form, respectively an object having the form of an anticlinal fold.

Test 9—FIG. 10: Effect of Bed Design

In these tests different types of mixing and bed designs were tested and compared to each other in a reactor as depicted on FIG. 1.

The conditions were as follows: Test 9a
Gas flow: 200-300 m3/h
Gas temperature: starting from 10° C.
Gas flow inlet: 2000-3000 ppm
Activated carbon catalyst: 1.2 m³ of extruded activated carbon catalyst with particle size 2-4 mm
Filler material: 0.27 m³ of 38.1 mm wide ceramic saddle filling material
Mixing method: random mixture: most efficient with 90-100% $SO_2$ cf. removal efficiency as shown on FIG. 10—left hand side
Comparative Example Test 9b—FIG. 10
The conditions were as follows:
Gas flow: 200-300 m³/h
Gas temperature: starting from 10° C.
Gas flow inlet: 2000-3000 ppm
Single activated carbon catalyst bed: 55-65% $SO_2$ removal efficiency as shown on FIG. 10—second from the left.
Comparative Example Test 9c—FIG. 10
The conditions were as follows:
Gas flow: 200-300 m³/h
Gas temperature: starting from 10° C.
Gas flow inlet: 2000-3000 ppm
Activated carbon catalyst: 1.2 m³ of extruded activated carbon catalyst with particle size 2-4 mm
Filler material: 0.27 m³ of 38.1 mm wide ceramic saddle filling material
Two activated carbon catalyst beds (0.5 m³ and 0.7 m³ respectively) separated by a layer of 0.27 m³ of filling material: less efficient with 50-65% $SO_2$ removal efficiency as shown on FIG. 10—third from the left.
Comparative Example Test 9d—FIG. 10
The conditions were as follows:
Gas flow: 200-300 m³/h
Gas temperature: starting from 10° C.
Gas flow inlet: 2000-3000 ppm
Activated carbon catalyst: 1.2 m³ of extruded activated carbon catalyst with particle size 2-4 mm
Filler material: 0.27 m³ of 38 mm wide ceramic saddle filling material
Multi layers design: activated carbon catalyst/filler material layers (0.3 m³ and 0.054 m³ respectively) was much less efficient with 70-80% $SO_2$ removal efficiency as shown on FIG. 10—right hand side
Test 10—FIG. 11: Effect of filler material/activated carbon volume ratio
The conditions were as follows:
Gas flow: 200-300 m3/h
Gas temperature: starting from 10° C.
Gas flow inlet: 2000-3000 ppm
Activated carbon catalyst: extruded activated carbon with particle size 2-4 mm
Filler material: 38 mm wide ceramic saddle filling material
Mixing method: random mixture with different ratio in volume (Filler material/extruded activated carbon catalyst):
1/20: 5 vol % filler material and 95 vol % activated carbon catalyst
1/10: 9 vol % filler material and 91 vol % activated carbon catalyst
1/5: 17 vol % filler material and 83 vol % activated carbon catalyst
1/4: 20 vol % filler material and 80 vol % activated carbon catalyst 1/3: 25 vol % filler material and 75 vol % activated carbon catalyst This test shows the highest efficiency with 99% $SO_2$ removal when operating with 20 vol % filler material and 80 vol % activated carbon catalyst (ratio 1/4) as shown on FIG. 11.

Test 11—FIG. 12: Effect of filler material/activated carbon volume ratio

The conditions were as follows:
Gas flow: 200-300 m3/h
Gas temperature: starting from 10° C.
Gas flow inlet: 2000-3000 ppm
Activated carbon catalyst: extruded activated carbon with particle size 2-4 mm
Filler material: 50 mm wide plastic pall ring filling material
Mixing method: random mixture with different ratio in volume (Filler material/extruded activated carbon catalyst):
1/20: 5 vol % filler material and 95 vol % activated carbon catalyst
1/10: 9 vol % filler material and 91 vol % activated carbon catalyst
1/5: 17 vol % filler material and 83 vol % activated carbon catalyst
1/4: 20 vol % filler material and 80 vol % activated carbon catalyst
1/3: 25 vol % filler material and 75 vol % activated carbon catalyst
Highest efficiency 82% $SO_2$ removal when operating with 20 vol % filler material and 80 vol % activated carbon (ratio 1/4) as shown on FIG. 12.

Test 11—FIG. 13: Effect of filler size
The conditions were as follows:
Gas flow: 200-300 m3/h
Gas temperature: starting from 10° C.
Gas flow inlet: 2000-3000 ppm
Activated carbon catalyst: extruded activated carbon catalyst with particle size 2-4 mm
Filler material: saddle filling material with different size from 12.7 (normalized size 1) to 76.2 mm (normalized size 6)
Mixing method: random mixture with 20 vol % filler material and 80 vol % activated carbon catalyst (ratio 1/4)
Higher efficiency with 88-99% $SO_2$ removal when operating with between 38.1 mm (normalized size 3) and 63.5 mm (normalized size 5) saddle filling material as shown on FIG. 13

Test 12—FIG. 14: Effect of filler particle size
The conditions were as follows:
Gas flow: 200-300 m3/h
Gas temperature: starting from 10° C.
Gas flow inlet: 2000-3000 ppm
Activated carbon catalyst: bead, extruded or granulated activated carbon catalyst
Filler material: 38.1 mm wide ceramic saddle filling material
Mixing method: random mixture with 20 vol % filler material and 80 vol % activated carbon catalyst (ratio 1/4)
Higher efficiency with 99% $SO_2$ removal when operating with extruded activated carbon catalyst as shown on FIG. 14.

Although the present disclosure has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar.

The invention claimed is:
1. A process, comprising:
   bringing a gas, containing $SO_2$ and $O_2$, in contact with a mixture of from 95% vol. to 50% vol. of activated carbon catalyst and from 5% vol. to 50% vol. of an inert filler material;
   wherein the mixture is a mixture of separate, distinct particles of filler and separate, distinct particles of activated carbon catalyst; and
   wherein the $SO_2$ is converted to $H_2SO_4$ on the activated carbon catalyst and is then washed from the activated carbon catalyst to obtain a $H_2SO_4$ solution.
2. The process as claimed in claim 1, wherein the filler material is between 10% vol. and 30% vol. of the mixture of activated carbon catalyst and a filler material.
3. The process as claimed in claim 1, wherein the mixture contains no other solid ingredients than the activated carbon catalyst and the filler material.
4. The process as claimed in claim 1, wherein the activated carbon catalyst is chosen from impregnated or activated carbon catalysts.
5. The process as claimed in claim 1, wherein the filler is chosen from fillers made of ceramic material, made of metal, fillers made of plastic mineral or mixtures thereof.
6. The process as claimed in claim 1, wherein the filler material is a shape comprising saddle shaped, ring shaped, ball shaped, torus shaped, prism shaped or irregular shaped.
7. The process as claimed in claim 1, wherein the mixture is in a fixed bed.
8. The process as claimed in claim 1, wherein the mixture is washed with water or an aqueous solution in an amount between 5 l/hour/m³ of catalyst and 100 l/hour/m³ of mixture.
9. The process as claimed in claim 1, wherein the mixture is washed by intermittent spraying with water or an aqueous solution in counterflow to the gas.
10. The process as claimed in claim 1, wherein the process is operated at a pressure from 0.9 to 1.1 atm.
11. The process as claimed in claim 1, wherein the water saturated gas containing $SO_2$ and $O_2$ is a waste gas generated by chemical and metallurgical processes.
12. The process as claimed in claim 1 wherein the $SO_2$ content of the gas is between 300 ppm and 200,000 ppm.
13. The process as claimed in claim 1, the gas being brought into contact with the mixture has a temperature of between 10 and 150° C.
14. The process as claimed in claim 1, wherein the $O_2$ content of the gas is between 2 and 21% vol.
15. The process as claimed in claim 1, wherein the $H_2SO_4$ content of the $H_2SO_4$ solution is between 5 and 50% vol.
16. The process as claimed in claim 1, wherein heavy metals are removed from the gas.
17. The process as claimed in claim 1, wherein organic contaminants are removed from the gas.

* * * * *